United States Patent [19]

Bensch et al.

[11] Patent Number: 4,992,871
[45] Date of Patent: Feb. 12, 1991

[54] METHOD AND APPARATUS FOR PROCESSING IDENTIFICATION SIGNALS

[75] Inventors: Uwe G. W. Bensch; Ralph A. von Vignau; Thomas E. F. Wille, all of Hamburg, Fed. Rep. of Germany

[73] Assignee: U.S. Philips Corporation, New York, N.Y.

[21] Appl. No.: 233,107

[22] Filed: Aug. 15, 1988

[30] Foreign Application Priority Data

Aug. 20, 1987 [DE] Fed. Rep. of Germany ....... 3727756

[51] Int. Cl.$^5$ .............................................. H04N 7/04
[52] U.S. Cl. .................................. 358/142; 358/147; 340/712
[58] Field of Search ...................... 358/142, 146, 147; 340/709–711

[56] References Cited

U.S. PATENT DOCUMENTS 4,587,520  5/1986  Astle .................................. 340/712

FOREIGN PATENT DOCUMENTS

0062491  5/1981  Japan ................................... 358/147
2192770  1/1988  United Kingdom ................. 358/147

Primary Examiner—James J. Groody
Assistant Examiner—David E. Harvey
Attorney, Agent, or Firm—Michael E. Marion

[57] ABSTRACT

A method and apparatus for processing identification signals in a data signal (teletext signal) which is cyclically repeated within a television signal and which can be displayed in the form of single still television pictures (teletext pages), whereby the manual entry of numbers for selecting the teletext pages is superfluous and the desired teletext pages can be selected in a simple and flawless way by searching a part of the teletext signal constituting at least a part of the contents of a selected teletext page for signal sequences representing three-digit, natural numbers, which sequences are separated as identification signals and are stored as signals assigned to the selected teletext page.

34 Claims, 5 Drawing Sheets

FIG.1

```
 0.--------     S100 100 ARD/ZDF Mi 13.06.87 13:27:54
 1.          ▒▒▒▒▒▒▒▒▒▒▒▒▒▒▒▒▒▒▒▒▒▒▒▒▒▒▒▒▒▒▒▒▒▒▒▒▒▒
 2.          ▒      Ü B E R S I C H T              ▒
 3.          ▒                                     ▒
 4.          ▒▒▒▒▒▒▒▒▒▒▒▒▒▒▒▒▒▒▒▒▒▒▒▒▒▒▒▒▒▒▒▒▒▒▒▒▒▒
 5.                Videotext-Auswahl bis 16.00 Uhr
 6.
 7.          UT-Vorschau.....144 Devisen..........218
 8.          ARD abends......160 VT über VT.......260
 9.          ARD vorm./nachm.162 Gfk-Zahlen.......298
10.---------EINS PLUS.......163 VT-Redaktion....299
11.          ARD-Mehrkanal...164 ARD-Nachtkonzert301
12.          ZDF abends......170 Umwelt..........331
13.          ZDF vorm./nachm.172 ARD Ratgeber....361
14.          3SAT............173 Nachrichten.401/402
15.          ZDF-Mehrkanal...174 Nachrichten.....403
16.          Hitparaden......186 Wetter..........446
17.          TV-Filme........199 Wetter(6 Tage)..449
18.          Kulturnotiz.....205 Lotto/Toto......450
19.          Warentest.......214 Sport...........500
20.---------Ernärungstip....216 Pressevorschau..600
21.          Videotext für alle - live............123
22.              ARD/ZDF-VIDEOTEXT-REDAKTION
23.          Masurenallee 16-20, D-1000 BERLIN 19
            :    :     :          :         :     :
            :    :     :          :         :     :
            :    :     :          :         :     :
            0 2 4 6 8 10          20        30    39
              1 3 5 7 9
```

METHOD AND APPARATUS FOR PROCESSING IDENTIFICATION SIGNALS

BACKGROUND OF THE INVENTION

The invention relates to a method of processing identification signals in a data signal (teletext signal) which is cyclically repeated within a television signal and can be displayed in the form of single still television pictures.

The data signal, referred to as teletext signal, which is cyclically repeated within a television signal and is transmitted in the so-called data lines of the television signal constitutes a system of teletext pages comprising all kinds of information. Some of the teletext pages which are preview pages or so-called index pages at least substantially indicate their contents and provide information about other teletext pages with, for example detailed messages and other particularities. The index pages are used for guidance of the user who can select the indicated page numbers by means of keys on the display device or a handheld unit and display them on a display device. In the case of a larger data content leading to a larger division of the data on different teletext pages a plurality of index pages often has to be selected via the keys on the handheld unit until the actually selected information is displayed on the display device. Entering numbers for this so-called paging in the teletext pages, particularly in the case of considerably dissected information, requires a great deal of concentration on the part of the user, because each entry error leads to the wrong teletext page and usually causes a return to the index pages, thus necessitating a new selection procedure.

SUMMARY OF THE INVENTION

It is an object of the invention to provide a method rendering the manual entry of numbers for selecting teletext pages superfluous and providing the possibility of selecting desired teletext pages in a simple and flawless manner.

According to the invention a part of the teletext signal constituting at least a part of the contents of a selected teletext page is searched for signal sequences representing three-digit, natural numbers. These signal sequences are separated as identification signals and stored as signals assigned to the selected teletext page.

In accordance with a standard for the teletext signal the page numbers of all teletext pages are constituted by three-digit natural numbers. The invention is based on the recognition that such numbers are not used or are only exceptionally used for purposes other than page number indications. For example, TV preview times or information about temperature and air pressure in weather forecasts are displayed in a different format. Thus, if a three-digit natural number occurs in the contents of a teletext page, it is most likely that it indicates a page number of a teletext page.

The method according to the invention thus separates signal sequences from the contents of a selected teletext page, which sequences are most likely to represent a page number. These signal sequences are stored as sequences assigned to the page number of the selected teletext page from which they have been separated. They can then be used directly or at a later stage for controlling the so-called paging in the teletext pages. If the user, who applies the method according to the invention, wants to select a teletext page for display on the display device and referred to on the previously selected teletext page, he need not separately enter the new page number via the handheld unit, because this number has already been selected from the displayed page and is already stored for simple selection of this teletext page. Moreover, this storage also makes a page number once found directly available for reselection of the teletext page to which this number is assigned. This particularly simplifies and speeds up paging via the index pages for selection of further pages comprising specific information.

To realize a simple and fast search of the identification signals to be separated, the contents of the selected teletext page are searched character by character for the presence of a signal sequence representing a digit and a group of signal sequence is separated as an identification signal if it comprises three successive signal sequences each representing a digit and if the signal sequences directly preceding and following the group of three successive signal sequences do not represent a digit. In this method it is initially checked whether a digit is present in the contents of the teletext page. This procedure is based on the recognition that the greater part of the contents of an average teletext page comprises characters which do not represent digits. A preselection is thus carried out in the contents of the teletext page. If this preselection reveals the presence of a first signal sequence representing a digit, it is subsequently checked whether this first signal sequence forms part of a group of signal sequences representing a three-digit natural number. To ensure that parts of signal sequences representing four-digit or multidigit numbers are not identified as identification signals to be separated, the signals directly preceding and succeeding a group of signal sequences identified as an identification signal are also checked. If correctly identified, these signals do not represent digits. Advantageously, this checking procedure is limited to the character succeeding the signal sequence to be separated as an identification signal, because the previous search for single digits has already ascertained the fact that the signal sequence preceding the identification signal does not represent digits.

According to a further advantageous embodiment of the invention only groups of signal sequences representing a natural number in the range between 100 and 899 are stored as identification signals. With this additional selection criterion it is much more likely that a teletext page number has actually been identified by means of a group of signal sequences identified as an identification signal. The agreed rule that teletext pages are only characterized by means of these page numbers is utilized in this case.

While utilizing the above-mentioned range of teletext page numbers, a particularly effective search is realized when the contents of the selected teletext page is searched character by character for the presence of a signal sequence representing a digit in the range between 1 and 8 when such a signal sequence is found the signal sequences directly following it are checked as to whether they represent two digits in the range between 0 and 9, followed by another character. This is an improvement of the method described hereinbefore.

Moreover, further modifications of the method are feasible. For example, the contents of the teletext page can be checked character by character as to whether a group of signal sequences representing three subsequent characters constitutes a three-digit natural number in the said range of numbers. Such a method may be advantageous if the selected teletext page substantially or exclusively comprises numbers.

The method according to the invention may also be used advantageously in that in the case of occurrence of a predetermined signal sequence following an identification signal, a given part of the data signal following the predetermined signal sequence is subjected to further searching steps. This provides a simple extension of the method, for example, to teletext page sub-addresses which are already transmitted as four-digit, so-called table numbers on some teletext pages whose contents are too large to be displayed within the size of the display screen. The separate selected teletext page is then displayed in a plurality of successive steps, i.e. in a plurality of successive so-called tables. In the teletext signal the table numbers constitute a signal segment which is associated with an identification signal corresponding to a teletext page number, while a predetermined signal sequence is added. This predetermined signal sequence is also referred to as "separating signal" or "delimiter" and preferably represents a slash or a comma. If, for example such a signal sequence subsequent to an identification signal is identified, the subsequent signal segment can be stored in accordance with the identification signal representing the page number for selection of the separate tables.

The invention is particularly applicable for providing easy paging when teletext pages are displayed on a picture display device. The identification signals and their associated positions on the teletext page are stored and a cursor is displayed on the picture display device, which cursor can be optionally assigned in accordance with the stored positions associated with the single numbers represented by the identification signals. With such a cursor each page number displayed on the teletext page can be referred to in a simple and readily visible way. This enhances easy reference of the teletext page and the user can apply the cursor as a kind of reader. It leads directly to the teletext page numbers offered to him for selection on the basis of the teletext page information contents. The assignment of the cursor to the separate stored identification signals simultaneously prepares selection in such a way that the user can immediately initiate selection of the cursor-assigned page number by a simple operation, preferably by pressing a single key.

For ease of operation it is advantageous that in a first step and after selection of a teletext page all signal sequences identified as identification signals are stored in the sequence of their occurrence in the contents of the teletext page. In the subsequent step the cursor is assigned to the first identification signal stored for the teletext page and it is displayed on the display device. For example, the cursor can be stepwise assigned to the other identification signals by means of simple jump instructions. The user will see that after selection of the teletext page the cursor automatically stops at the first number identified as a page number and that it jumps to the next number whenever a key is depressed. This operation provides the possibility of selecting the teletext page associated with the page number thus marked and it can be displayed instead of the teletext page in which the user has searched the page number.

In such a method faulty identifications of page numbers lead to minor disturbances. For example, if the contents of a selected teletext page includes a three-digit natural number which does not represent a page number, the user will immediately recognize this when he moves the cursor. In such individual cases he can move the cursor without reverting to the number erroneously stored as an identification signal and hence as a page number.

However, the method according to the invention may be further characterized in that when a teletext page is displayed on a picture display device the search for an identification signal is interrupted and a cursor is assigned to the number represented by said identification signal and displayed on the picture display device. A complete search of the contents of the newly selected teletext page is prevented thereby and the search stops at the next signal sequence identified as an identification signal. Consequently, the time interval between selection of a teletext page and the appearance of the cursor on the first displayed page number can be reduced. However, the identification signals found and their position on the teletext page can be stored as signals assigned to this page so that identification signals which have already been found can be reverted to more quickly.

If in the method according to the invention at least a stored identification signal is addressed for selecting a (further) teletext page, the user may not only do this by direct operation, but it may also proceed automatically in such a way that the selection in accordance with the stored identification signals is already initiate immediately after searching and storing the identification signals. Preferably, the contents of a teletext page is searched for signal sequences representing identification signals after this teletext page has been selected. identified identification signals are stored in the sequence in which they have been found If the entire contents of the selected teletext page being displayed has been searched, the stored identification signals are successively searched to select the teletext page with the page number represented by the relevant identification signal in a subsequent step, which is neither influenced by the user, nor is visible to him. The teletext page is thus taken from the teletext signal and stored in a memory. In the meantime the user can select a desired page by means of the movable cursor from the teletext pages referred to in the contents of the displayed teletext page. If this desired page has already been taken from the data signal and stored in the memory by way of the automatic selection procedure, it can be displayed on the display device without any further delay. However, if this page has not yet been found in the automatic selection procedure, the user has the advantage that the waiting time for display of this page is reduced to the remaining period of the automatic selection procedure. In this way paging can be speeded up.

A modification of the described method of selecting page numbers already identified in the contents of a displayed teletext page can be realized in that, associated with the teletext page number, only those positions of the identification signals are stored that are included in the contents of this teletext page and represent page numbers. This also provides the possibility of setting the cursor at the displayed page numbers without any further search. If the associated teletext page is to be selected as the next page, the page number just assigned to the cursor can be read from the contents of the teletext page and used in the manner described. This saves memory sites.

In a further advantageous embodiment of the method according to the invention an identification is stored when identification signals in a teletext page exceed or become below a predetermined minimum number and/or maximum number, which identification is used for a simplified selection of said teletext page. This embodiment is based on the recognition that the contents of the preview or index pages usually comprise a large number of page numbers, whereas the contents of teletext pages comprising specific information usually have very few page numbers or no page numbers at all. The identification automatically characterizes an index page as such and thus it is easy to find again during paging. In fact, experience has proved that such pages are most likely to be referred to again. Finding the teletext pages characterized as index pages is preferably simplified in that the stored identifications are displayed on the display device. In particular this identification can be displayed as an indication remaining unchanged throughout the paging process, i.e. an indication which is independent of the contents of the teletext page which has just been selected. The user thus has a permanent record of the identified index pages and he can revert to this record at random, preferably by moving the cursor, but also in the conventional manner by depressing the keys for the page number indicated.

Storage of the above-mentioned identification may be made dependent on the fact whether the number of identification signals in the teletext page does not exceed a maximum number. This is based on the recognition that the amount of page numbers on a conventional index page is limited. However, if an amount of three-digit natural numbers exceeding this conventional amount is identified in a teletext page, it is most likely that this teletext page is not an index page but a table of numbers having a different content.

The method according to the invention can be realized in a television receiver by means of a control unit controlling the reception and processing of the data signal (teletext signal). Preferably this control unit comprises a microprocessor with an instruction memory in which the commands associated with the method are stored.

BRIEF DESCRIPTION OF THE DRAWINGS

The invention will now be described in greater detail, by way of example, with reference to the accompanying drawings in which.

DETAILED DESCRIPTION OF THE INVENTION

Figure 1:
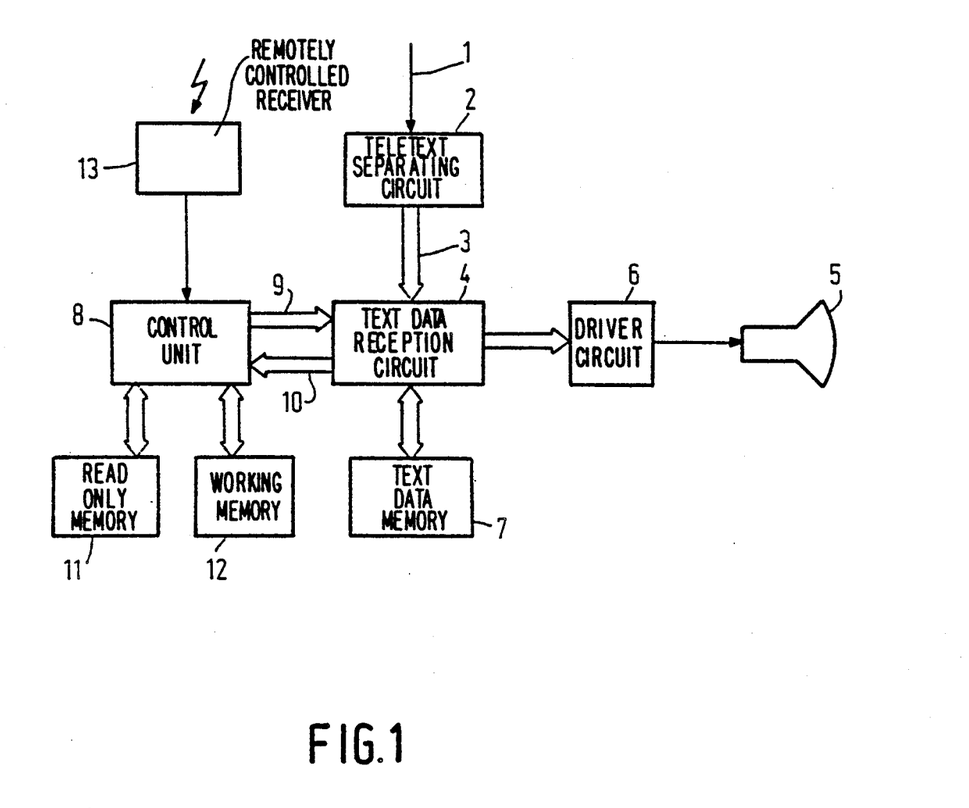
FIG. 1 is a block diagram of a circuit arrangement with which the method according to the invention can be carried out.

FIG. 1 is a block diagram of a television receiver arrangement with which a cyclically repeated data signal (teletext signal) in the television signal can be processed. Together with the picture signal of the television signal, this signal is applied via a line 1 to a teletext separating circuit 2. For further processing, the teletext signal separated from the picture signal in this circuit is applied via a line 3 to a text data reception circuit 4. This is a known component, for example of the type SAA 5240 in which the teletext signal is decoded and evaluated. The text data reception circuit 4 also generates the signals required for building up the picture with which the teletext pages are displayed on a monitor 5 used as a display device. The teletext signal to be displayed and the signals required for building up the picture are applied via an adaptation and driver circuit 6 from the text data reception circuit 4 to the monitor 5. The text data reception circuit 4 is also connected to a text data memory 7 in which the teletext signal can be stored in the form of at least one teletext page, but preferably in a plurality of pages.

The text data reception circuit 4 is controlled by a control unit 8 preferably constituted by a microprocessor, for example of the type MAB 8032. The text data reception circuit 4 receives control commands from the control unit 8 via a command line 9 and it transmits the teletext signal in the opposite direction via a text data line 10. The control unit 8 is also connected to a read-only memory 11 and a working memory 12. The read-only memory essentially stores control commands by means of which the control unit 8 processes the teletext signal, inter alia also in accordance with the inventive method. The working memory 12 is used inter alia for buffering and storing the signals gained by the control unit. Moreover, the control unit 8 is connected to a remotely controlled receiver 13 via which a user applies control commands, for example, numbered entries and other commands for selecting certain teletext pages, commands for paging and preferably the commands required for the method according to the invention.

Figure 2:
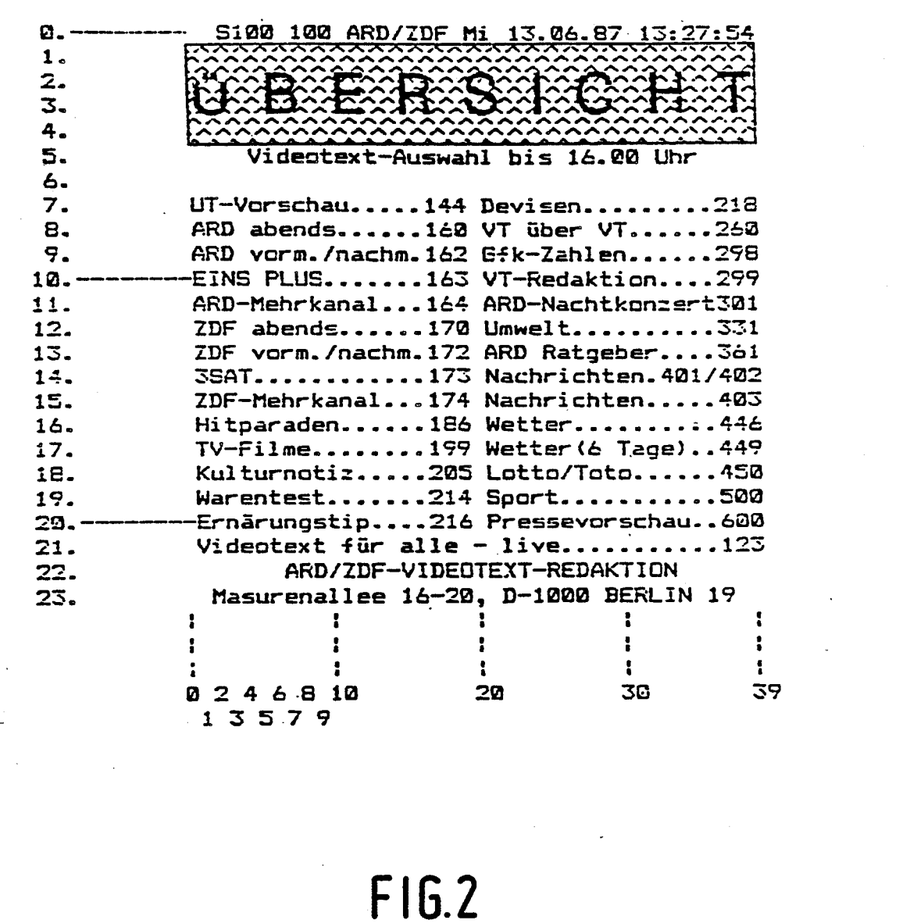
FIG. 2 shows an example of a teletext index page.

FIG. 2 shows a teletext index page on a picture display device, for example the monitor 5 of FIG. 1. This page comprises 24 lines which are enumerated 0 to 23 on the left-hand edge of the picture and 40 characters in each line enumerated 0 to 39 on the lower edge of the picture. The enumerations on the edges of the picture are neither comprised in the teletext signal, nor do they appear on the monitor, but they have only been added for the purpose of a better explanation of the teletext page shown.

In the teletext page shown the line 0 is the teletext headline comprising the page number, date, time and other identifications. The lines 1 to 23 relate to the content of the teletext page used for carrying out the method according to the invention.

Figure 3:
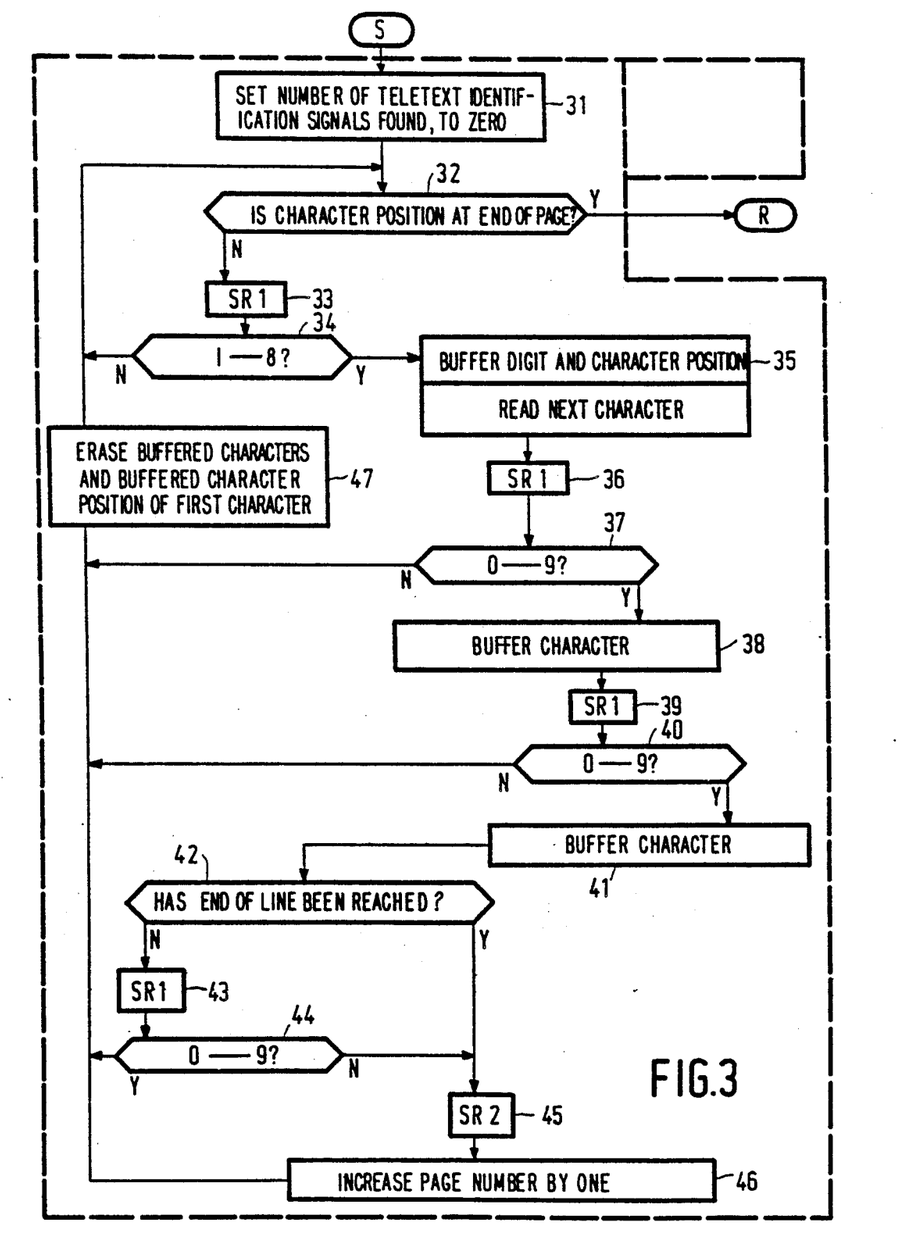
FIG. 3 is a flow chart to explain the method according to the invention.

FIG. 3 is a flow chart of an embodiment of the inventive method of processing identification signals in the teletext signal. The associated steps to be carried out start from the initial cursor S. In the first step 31 the number of identification signals representing a teletext page number and found on the teletext page to be searched is set to 0. Moreover, an internal pointer (not shown) which successively stops at all characters on the teletext page and by which the signal sequence for the control unit 8 is prepared for processing, is set at the start of the teletext page. Since the teletext headline in a teletext page does not comprise signals which are required for carrying out the method according to the invention, the start of the character position of the character 0 is line 1.

In the next step 32 it is checked whether the character position is already located at the end of the teletext page to be searched. If this is the case, the search for identification signals is ended, which is indicated by the end cursor R in FIG. 3

Figure 4:
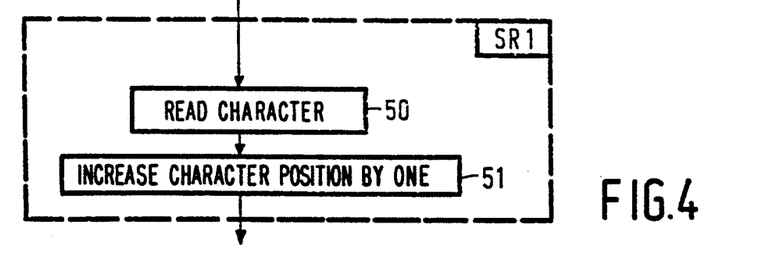
FIGS. 4 and 5 show details of the flow chart of FIG. 3.

If the character position has not reached the end of the page, the character indicated by the character position or the signal sequence representing this character is taken from the teletext signal in a step 33 and the character position is increased by 1, i.e. the internal pointer is set to the next character on the teletext page. This sequence of steps designated SR1 is shown in greater detail in FIG. 4. It comprises a step 50 for reading the character and a step 51 in which the character position is increased by 1. The character which is read or the signal sequence representing this character is now checked in step 34 on the presence of a digit in the range between 1 and 8. If this is not the case, a return to the start of the procedure is made so as to check whether the end of the page has already been reached with the character position (step 32), and if this check proves negative, the next character is read, i.e. the steps 33 of the method are carried out again.

However, if a digit in the range between 1 and 8 is found, this digit as well as the associated character position is buffered in a step 35 and subsequently the next character is read by means of the step 36 (SR1) This character is checked on whether it constitutes a digit in the range between 0 and 9 (step 37). If this check proves positive, this character is also buffered (step 38) and the same check is once more carried out for the next character (steps 39, 40, 41). However, if one of the two last-mentioned checks proves negative, all buffered characters and the buffered character position of the first character recognized as a digit are erased in a step 47 and a search for a digit between 1 and 8 is made again among the subsequent characters of the teletext page. However, if all three checks prove positive, this means that a digit sequence ranging between 100 and 899 has been found in the contents of the teletext page.

Figure 5:
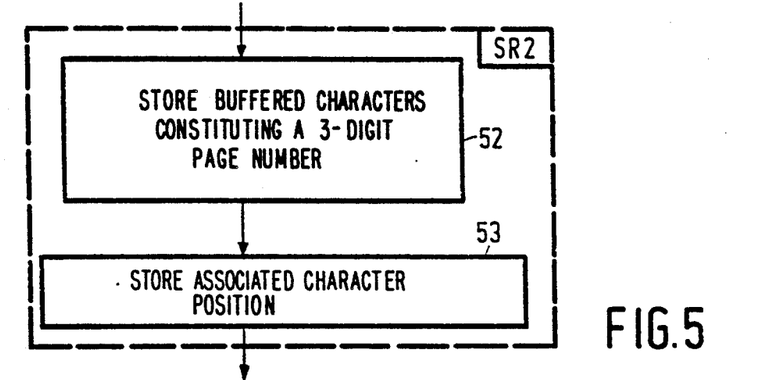

To finish and complete the steps described, it should further be checked whether the character subsequent to the character sequence identified as a digit sequence in the range between 100 and 899 is a further digit, because also this case excludes the presence of a teletext page number. Consequently, the character position is examined in a step 42 so as to find out whether the end of a line on the teletext page has been reached. This examination is carried out to speed up the method because most page numbers are always arranged at the end of a line in the contents of a teletext page, compare FIG. 2. It should be taken into account that the index page shown in FIG. 2 is an exception in so far as it has two columns, so that page numbers also occur between the columns. Only in such cases is the step SR1 carried out once again (step 43) in the method according to FIG. 3 for the purpose of terminating the search for a three-digit number, and the character gained is checked on whether it represents a digit in the range between 0 and 9 (step 44) If this is the case, a number comprising at least four digits will be found, which in accordance with the standard for teletext page numbers cannot represent such a number. However, if any other character is recognized, a teletext page number is available. In a step 45 designated SR2 shown in greater detail in FIG. 5 this number is composed from the three buffered characters and, together with the buffered character position, it is stored as an identified identification signal with the associated identified character position assigned to the teletext page just displayed. This is preferably effected in the working memory 12. Moreover, the number of page numbers found on the teletext page being searched is increased by 1 in a step 46, i.e. the identification of a page number, assigned to the searched teletext page, is marked. Finally the characters and the character position are erased again from the buffer storage in step 47 so as to prepare them for the search for the next number. The method is then continued by checking whether the character position has already reached the end of the page. It is to be noted that step 45 (SR2) comprises a step 52 for storing the three buffered characters constituting a 3-digit page number, and a step 53 for storing the associated character position which is also buffered.

When searching the teletext page shown in FIG. 2 in accordance with the method illustrated by the flow chart of FIG. 3, the characters of the lines 1 to 4 as well as of the lines 5 to the 26th character would not be recognized as characters constituting a digit in the range between 1 and 8 and the first loop of the method (steps 32, 33, 34) is continuously processed. The character 27 of line 5 is the first to fall within the searched range and is buffered in accordance with its character position. Also the next character—the digit 6—fulfills the subsequent condition of the search and is also buffered. However, as a third character a point is read as from position 29 in line 5, resulting in the characters and character position buffered so far being erased and in a renewed start of the search for a digit in the range between 1 and 8. Since the two zeroes at positions 30 and 31 of the line 5 do not meet this condition, the digit 1 is firstly recognized at position 17 on line 7. The page number 144 introduced with this digit is the first on this teletext page to fulfill all conditions for identification as an identification signal to be buffered, because the character subsequent to it is a blank space.

At the end of line 7 the page number 218 is recognized as such and it is buffered without reading a subsequent character because the character position has reached the end of the line in this case.

Similarly, all other page numbers of the displayed teletext page, including the page numbers 401 and 402 separated by a slash in line 14 are identified and stored. However, the character sequences "3SAT" in line 14 and the digit sequences "16-20", "1000" and "19" do not fulfill all conditions and do not disturb the process run.

Figure 6:
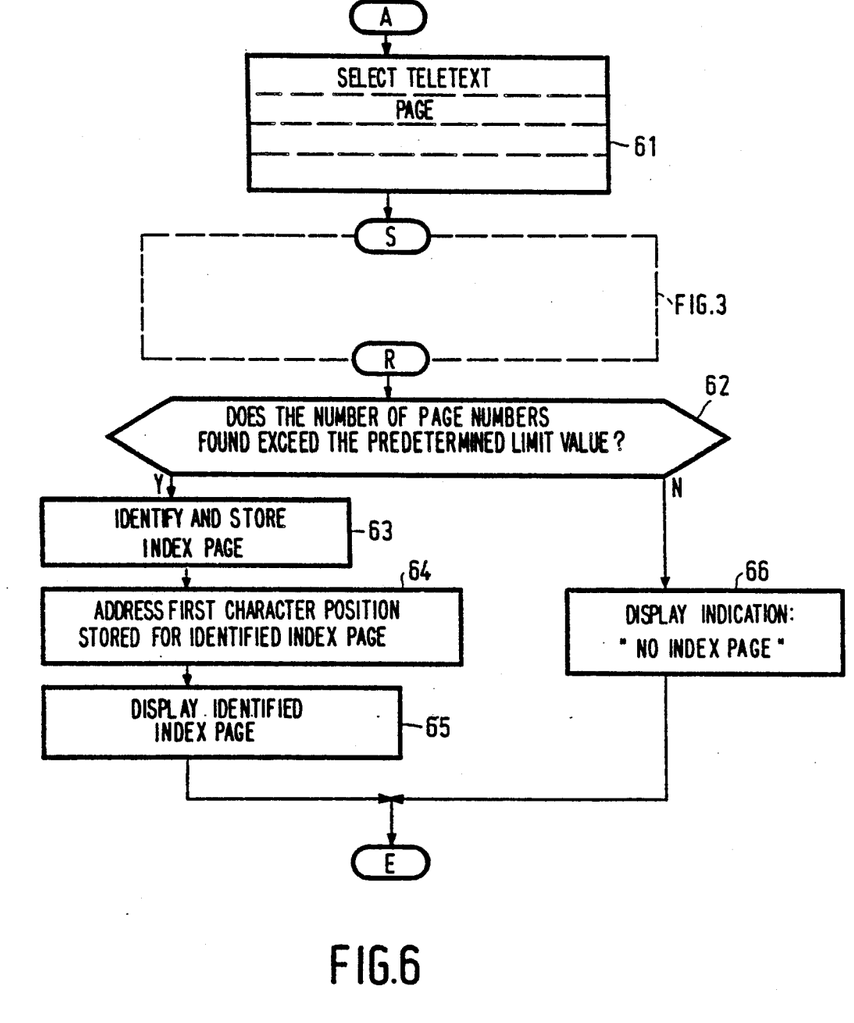
FIG. 6 is a flow chart of a method of processing and displaying a teletext signal in which the method according to the invention is used.

FIG. 6 shows an example of a process run in which the method according to FIG. 3 is included. Starting at the initial cursor A in the flow chart, a teletext page having a predetermined page number is selected in known manner in a step 61 for displaying the teletext signal. This selection can be carried out by entering the number via numbered keys on a handheld unit. However, if the signal sequence representing the page number is already stored in the working memory 12, it may simply be addressed to select the associated teletext page. The command for selecting the page can also be given automatically by the control unit without any special entry command from the user. In any case the text data reception circuit 4 searches for the page identified by the given page number in the permanently received (cyclically repeated) teletext signal and stores its contents in the text data memory 7, namely in a storage range within the text data memory designated as page memory. Subsequently the contents of the teletext page just stored are automatically searched for three-digit natural numbers by means of the control unit 8 via the text data reception circuit 4 and the text data line 10 in accordance with the method of FIG. 3, while the corresponding read commands within the step SR1 are passed through the command line 9.

When the teletext page has been searched completely, it is checked in a step 62 in the process run of FIG. 6 whether the number of page numbers found exceeds a predetermined limit value. If this is the case, the searched teletext page is considered as a preview or index page in a step 63 and its page number is provided with a corresponding identification and stored. The limit value is chosen in accordance with the rate of occurrence of page numbers in index pages and in the other teletext pages. Thus, a teletext page can be considered, for example, as an index page if more than two page numbers are found on this page. To ensure easy handling for the selection, desired by the user, of (further) teletext pages with reference to the indications on the displayed index page, the process is continued in a step 64 by addressing the first character position stored for the identified index page and by displaying, in a step 65, a cursor assigned to the page number at the first character position on the monitor 5. However, if the number of page numbers found does not reach the limit value, an indication "no index page" appears by means of a step 66 on the monitor.

When continuing through the part of the process shown in FIG. 6—the process subsequent to the end cursor E—further process steps may be carried out with which the user can set the cursor to a desired page number and with which he can select the associated teletext page. This might be followed, for example, by a renewed run through the process steps in accordance with FIG. 6, this time for the newly selected teletext page.

Figure 7:
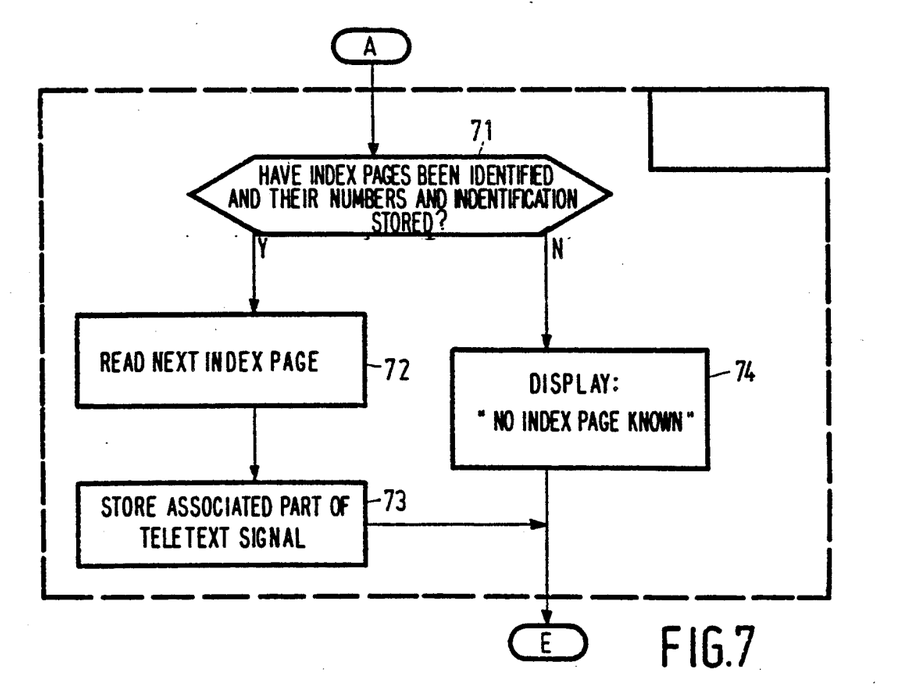
FIG. 7 is a flow chart of a further embodiment of the method described.

FIG. 7 is a further embodiment of the method according to the invention, showing a sequence of process steps for addressing index pages which are already known, which sequence is started with a single piece of information on an index page for so-called repaging of a teletext page. The process steps shown enable selection of the already identified index pages in one operation which does not necessitate any entry of page numbers via the keys on a handheld unit. For this purpose it is initially checked in a step 71 whether index pages have already been identified and whether their numbers with the corresponding identification have been stored in the working memory 12. If this is the case, the index page number which is next in the sequence of storage—for example starting from an index page number reached during paging—is read from the working memory 12 by means of step 72 and is prepared from the teletext signal via the control unit 8 and the command line 9 in the text data reception circuit 4 for selecting the associated index page. If the part of the teletext signal associated with this index page is received via the teletext separating circuit 2 and the line 3, it is stored in the text data memory 7 by means of step 73 and displayed on the monitor 5. If the text data memory 7 is sufficiently large, the selected index page may already have been stored, possibly for the entire duration of paging. It can then be retrieved from the text data memory without any further delay and be displayed.

However, if no teletext page was identified and marked as an index page, the control unit 8 would display, by means of step 74, an indication "no index page known" on the monitor instead of the previously described process steps.

What is claimed is:

1. A method for processing identification signals present in a data signal providing at least one teletext page which can be displayed as a television picture on a television display, said data signal comprising a plurality of signal sequences which are assigned respective associated character positions on said television picture, said method comprising the steps of:
   (a) searching said teletext page character position by character position and identifying at least one group of three successive signal sequences each representing a digit and each group being directly preceded and followed by signal sequences not representing a digit, each group of sequences representing a three digit natural number; and
   (b) storing a first identification signal assigned to said teletext page and representing said group of signal sequences.

2. A method as claimed in claim 1 wherein said three digit natural number is in the range between 100 and 899.

3. A method as claimed in claim 1 wherein said teletext page is searched character position by character position for the presence of a signal sequence representing a digit in the range between 1 and 8 directly followed by two further signal sequences each representing digits in the range between 0 and 9, followed by a further signal sequence representing another character.

4. A method as claimed in claim 1 comprising the further step of searching said teletext page for the occurrence of a predetermined signal sequence following said group of signal sequences and subjecting a given part of the data signal following the predetermined signal sequence to further searching steps.

5. A method as claimed in claim 1 comprising the additional step of addressing a stored first identification signal to select a further teletext page.

6. A method as claimed in claim 2, comprising the further step of searching said teletext page for the occurrence of a predetermined signal sequence following said group of signal sequences and subjecting a given part of the data signal following the predetermined signal sequence to further searching steps.

7. A method as claimed in claim 3, comprising the further step of searching said teletext page for the occurrence of a predetermined signal sequence following said group of signal sequences and subjecting a given part of the data signal following the predetermined signal sequence to further searching steps.

8. A method as claimed in claim 2 comprising the additional step of addressing a stored first identification signal to select a further teletext page.

9. A method as claimed in claim 3 comprising the additional step of addressing a stored first identification signal to select a further teletext page.

10. A method as claimed in claim 4 comprising the additional step of addressing a stored first identification signal to select a further teletext page.

11. The method of claim 1 comprising the additional steps of displaying a movable cursor as part of said television picture and assigning said cursor to a particular character position so as to select a particular stored first identification signal.

12. A method as claimed in claim 11 wherein the cursor is assigned to a first stored first identification signal and stepwise assigned to a further stored first identification signal.

13. A method as claimed in claim 12 comprising the additional step of addressing a stored first identification signal to select a further teletext page.

14. A method of claim 2 comprising the additional steps of displaying a movable cursor as part of said television picture and assigning said cursor to a particular character position so as to select a particular stored first identification signal.

15. The method of claim 3 comprising the additional steps of displaying a movable cursor as part of said television picture and assigning said cursor to a particular character position so as to select a particular stored first identification signal.

16. The method of claim 4 comprising the additional steps of displaying a movable cursor as part of said television picture and assigning said cursor to a particular character position so as to select a particular stored first identification signal.

17. A method as claimed in claim 1 comprising the additional steps of:
   (a) determining the number of said groups of signal sequences identified; and
   (b) storing a second identification signal if the number of said groups of signal sequences identified exceeds a predetermined amount.

18. A method as claimed in claim 2 comprising the additional steps of:
   (a) determining the number of said groups of signal sequences identified; and
   (b) storing a second identification signal if the number of said groups of signal sequences identified exceeds a predetermined amount.

19. A method as claimed in claim 3 comprising the additional steps of:
   (a) determining the number of said groups of signal sequences identified; and
   (b) storing a second identification signal if the number of said groups of signal sequences identified exceeds a predetermined amount.

20. A method as claimed in claim 4 comprising the additional steps of:
   (a) determining the number of said groups of signal sequences identified; and
   (b) storing a second identification signal if the number of said groups of signal sequences identified exceeds a predetermined amount.

21. A method as claimed in claim 12 comprising the additional steps of:
   (a) determining the number of said groups of signal sequences identified; and
   (b) storing a second identification signal if the number of said groups of signal sequences identified exceeds a predetermined amount.

22. A method as claimed in claim 5 comprising the additional steps of:
   (a) determining the number of said groups of signal sequences identified; and
   (b) storing a second identification signal if the number of said groups of signal sequences identified exceeds a predetermined amount.

23. A method as claimed in claim 1 comprising the additional steps of:
   (a) determining the number of said groups of signal sequences identified; and
   (b) storing a second identification signal if the number of said groups of signal sequences identified is below a predetermined amount.

24. A method as claimed in claim 2 comprising the additional steps of:
   (a) determining the number of said groups of signal sequences identified; and
   (b) storing a second identification signal if the number of said groups of signal sequences identified is below a predetermined amount.

25. A method as claimed in claim 3 comprising the additional steps of:
   (a) determining the number of said groups of signal sequences identified; and
   (b) storing a second identification signal if the number of said groups of signal sequences identified is below a predetermined amount.

26. A method as claimed in claim 4 comprising the additional steps of:
   (a) determining the number of said groups of signal sequences identified; and
   (b) storing a second identification signal if the number of said groups of signal sequences identified is below a predetermined amount.

27. A method as claimed in claim 12 comprising the additional steps of:
   (a) determining the number of said groups of signal sequences identified; and
   (b) storing a second identification signal if the number of said groups of signal sequences identified is below a predetermined amount.
   (b) storing a second identification signal if the number of said groups of signal sequences identified is below a predetermined amount.

28. A method as claimed in claim 5 comprising the additional steps of:
   (a) determining the number of said groups of signal sequences identified; and
   (b) storing a second identification signal if the number of said groups of signal sequences identified is below a predetermined amount.

29. A method as claimed in claim 1 comprising the additional steps of:
   (a) interrupting said search of said teletext page after identifying said group of signal sequences;
   (b) assigning a cursor to said three digit natural number; and
   (c) displaying said assigned cursor on said television display.

30. A method as claimed in claim 2 comprising the additional steps of:
   (a) interrupting said search of said teletext page after identifying said group of signal sequences;
   (b) assigning a cursor to said three digit natural number; and
   (c) displaying said assigned cursor on said television display.

31. A method as claimed in claim 3 comprising the additional steps of:
   (a) interrupting said search of said teletext page after identifying said group of signal sequences;
   (b) assigning a cursor to said three digit natural number; and
   (c) displaying said assigned cursor on said television display.

32. A method as claimed in claim 4 comprising the additional steps of:
   (a) interrupting said search of said teletext page after identifying said group of signal sequences;
   (b) assigning a cursor to said three digit natural number; and (c) displaying said assigned cursor on said television display.

33. The method of claim 17 comprising the further step of displaying the stored second identification signal on said television display.

34. A circuit for processing identification signals present in a data signal providing at least one teletext page which can be displayed as a television picture on a television display, said data signal comprising a plurality of signal sequences which are assigned respective associated character positions on said television picture, said circuit comprising:

(a) means for searching said teletext page character position by character position for identifying at least one group of signal sequences each representing a digit and each group being directly preceded and followed by signal sequences not representing a digit; each group of sequences representing a three digit natural number; and (b) means coupled to said searching means for storing a first identification signal assigned to said teletext page and representing said group of signal sequences.

* * * * *